United States Patent
Ishibe

(10) Patent No.: US 8,767,300 B2
(45) Date of Patent: Jul. 1, 2014

(54) DIFFRACTION ELEMENT, MANUFACTURING METHOD FOR DIFFRACTION ELEMENT, AND SPECTROMETER USING THE SAME

(75) Inventor: Yoshihiro Ishibe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 206 days.

(21) Appl. No.: 12/776,649

(22) Filed: May 10, 2010

(65) Prior Publication Data

US 2010/0284084 A1  Nov. 11, 2010

(30) Foreign Application Priority Data

May 9, 2009  (JP) ................... 2009-114058

(51) Int. Cl.
*G02B 27/44* (2006.01)
*G02B 5/18* (2006.01)
*G01J 3/40* (2006.01)
*G01J 3/447* (2006.01)
*B23B 3/00* (2006.01)

(52) U.S. Cl.
USPC ........... 359/570; 359/563; 359/572; 359/574; 359/575; 356/305; 356/328; 82/1.11

(58) Field of Classification Search
USPC ......... 359/558, 559, 563, 566, 569, 570, 572, 359/574, 575; 356/300, 302, 305, 326, 328; 82/1.11
See application file for complete search history.

(56) References Cited

U.S. PATENT DOCUMENTS

| | | | | |
|---|---|---|---|---|
| 4,815,849 A | * | 3/1989 | Sullivan | 356/328 |
| 5,066,127 A | * | 11/1991 | Schwenker | 356/328 |
| 5,371,586 A | * | 12/1994 | Chau | 356/301 |
| 5,384,656 A | * | 1/1995 | Schwenker | 359/569 |
| 2005/0117930 A1 | * | 6/2005 | Akizuki et al. | 399/69 |
| 2007/0291266 A1 | | 12/2007 | Handa et al. | |

FOREIGN PATENT DOCUMENTS

| | | | | |
|---|---|---|---|---|
| JP | 5-340813 A | | 12/1993 | |
| JP | 08271335 A | * | 10/1996 | ........... G01J 3/18 |
| JP | 2007-333581 A | | 12/2007 | |

* cited by examiner

*Primary Examiner* — Alessandro Amari
*Assistant Examiner* — Kendrick Liu
(74) *Attorney, Agent, or Firm* — Rossi Kimms & McDowell LLP

(57) ABSTRACT

Objects are to obtain a highly accurate diffraction element that may prevent an intensity decrease of a light beam entering a light receiving unit without a decrease in diffraction efficiency and without a problem of flare or the like, a manufacturing method for the diffraction element, and a spectrometer using the same. A diffraction element (2) includes a diffraction grating formed on a substrate having a curved surface. In the diffraction element (2), the curved surface (3) has an anamorphic shape formed by pivoting a curved line (I) in a plane about a straight line (II) in the same plane serving as a rotation axis, and gratings (10*a*) of the diffraction grating (10) exist in cross sections orthogonal to the rotation axis.

12 Claims, 13 Drawing Sheets (I): CURVATURE RADIUS R

CURVATURE RADIUS r

DIFFRACTION ELEMENT, MANUFACTURING METHOD FOR DIFFRACTION ELEMENT, AND SPECTROMETER USING THE SAME

BACKGROUND OF THE INVENTION

1. Field of the Invention

The present invention relates to a diffraction element used in a spectrometer which is used for spectral analysis for a light beam (light), a manufacturing method (processing method) for a diffraction element, and a spectrometer using the same.

Further, the present invention relates to a color image forming apparatus which uses the spectrometer using the diffraction element so as to perform spectral analysis for an output image.

2. Description of the Related Art

Most conventional spectrometers use a diffraction element. In particular, there is provided a well-known compact spectrometer having a structure in which a slit is disposed at an arbitrary position on the Rowland circle of a concave diffraction element (see Japanese Patent Application Laid-Open No. H05-340813 and Japanese Patent Application Laid-Open No. 2007-333581).

Note that the concave diffraction element means a diffraction element formed so that a substrate on which the diffraction grating is formed has a concave surface.

FIG. 18 is a principal part cross sectional view of this type of spectrometer in a spectral direction.

In FIG. 18, a light beam entering through an incident slit 101 is diffracted by a concave diffraction element 102 having fine grooves formed in a direction perpendicular to the paper face in different angles for respective wavelengths, which are condensed on a one-dimensional array light detector 103 such as a CCD. Then, intensity values of light beams entering individual light receiving elements of the one-dimensional array light detector 103 are measured so that spectral measurement is performed.

Here, the Rowland circle is defined as a circle that passes through the center of the concave diffraction element 102 and has a diameter set as a curvature radius thereof. A circle drawn by a dotted line denoted by reference numeral 104 is the Rowland circle.

The light beam entering through the incident slit 101 on the Rowland circle 104 is reflected and diffracted by the concave diffraction element 102, and then forms an image on the Rowland circle 104.

Therefore, the incident slit 101 and the light detector 103 are disposed on the Rowland circle 104 so as to perform the spectral measurement with high accuracy.

The concave shape of the concave diffraction element 102 that is used for the conventional spectrometer is usually set as a spherical surface. Imaging states on the light detector 103 in this case are illustrated in FIGS. 19 and 20.

FIG. 19 is a diagram illustrating an imaging state in a cross section in the spectral direction from the incident slit 101 to the light detector 103.

Note that FIG. 19 representatively illustrates an imaging state of a light beam of a specific wavelength that is reflected and diffracted by the concave diffraction element 102.

Because the light detector 103 is disposed on a part of the Rowland circle 104, in the cross section in the spectral direction, the reflected and diffracted light beam forms an image appropriately on the light detector 103.

On the other hand, FIG. 20 is a diagram illustrating an imaging state in a cross section in the direction orthogonal to the spectral direction from the concave diffraction element 102 to the light detector 103, i.e., in the direction in which the grooves of the diffraction grating extend.

Similarly to FIG. 19, FIG. 20 representatively illustrates an imaging state of a light beam of a specific wavelength that is reflected and diffracted by the concave diffraction element 102.

In the cross section illustrated in FIG. 20, the reflected and diffracted light beam does not form an image on the light detector 103 but forms an image at a position far from that of the light detector 103 when viewed from the concave diffraction element 102.

This is because the light beam reflected and diffracted by the concave diffraction element 102 and the line connecting a contact point A of the concave diffraction element 102 and the Rowland circle 104 with a center point A' of the Rowland circle forms a predetermined angle φ in the case of FIG. 19, while the light beam and the line do not form the angle in the case of FIG. 20.

Because measurement accuracy of the spectrometer depends on imaging performance in the spectral direction illustrated in FIG. 19, the light detector 103 may be disposed on the Rowland circle 104 or in its vicinity.

Therefore, there is a malfunction that the light beam is not naturally condensed in the direction orthogonal to the spectral direction, and intensity values of the light beams entering the light receiving elements of the light detector 103 are lowered.

In order to prevent the malfunction, the concave shape of the concave diffraction element 102 only needs to be set so that the curvature radius in the cross section orthogonal to the spectral direction illustrated in FIG. 20 is smaller than the curvature radius in the cross section in the spectral direction illustrated in FIG. 19.

In other words, if the shape of the concave diffraction element 102 is set to have an anamorphic toric surface, the above-mentioned malfunction may be resolved.

Hereinafter, the above-mentioned toric surface is described with reference to FIG. 21.

In FIG. 21, with respect to the concave diffraction element 102, a rectangular coordinate system is defined so that the cross section in the spectral direction illustrated in FIG. 20 corresponds to the xy plane while the cross section in the direction orthogonal to the spectral direction illustrated in FIG. 20 corresponds to the zx plane.

Here, the concave shape of the concave diffraction element 102 is set so that a curvature radius r in the cross section (in the zx plane) in the direction orthogonal to the spectral direction (y direction) is smaller than a curvature radius R in the cross section (in the xy plane) in the spectral direction. From this fact, it is considered that the concave shape of the concave diffraction element 102 is set as a so-called general toric surface in which an arc having the curvature radius r is rotated about the z axis as a rotation axis along an arc having the radius R.

In this specification, the above-mentioned general toric surface is referred to as a "z-toric surface" hereinafter.

In addition, the spectral direction of the concave diffraction element 102 is in the xy plane illustrated in FIG. 21. Therefore, gratings of the diffraction grating on the concave diffraction element 102 form lines parallel to the z axis when the concave diffraction element 102 is viewed from the X-axis direction shown in FIG. 21.

A specific pattern of a diffraction grating 201 formed on the concave diffraction element 102, which is viewed from X-axis direction shown in FIG. 21, is illustrated in FIG. 22.

In addition, in order to improve diffraction efficiency of the concave diffraction element 102, in general, the diffraction grating of the concave diffraction element 102 may be a blazed grating.

FIG. 23 is a diagram illustrating a structure of the diffraction grating (blazed grating) 201 in the cross section (XY section) in the spectral direction of the concave diffraction element 102.

In FIG. 23, incident light entering the concave diffraction element 102 is reflected and diffracted by the diffraction grating 201. In this case, if a first-order diffracted light is used for the spectral analysis, the blazed grating 201 as illustrated in FIG. 23 is used, and an oblique surface 202 of the diffraction grating 201 is inclined to the direction in which the first-order diffracted light is reflected and diffracted so that diffraction efficiency in the first-order diffracted light may be improved.

Next, a processing method (manufacturing method) of the blazed grating 201 illustrated in FIG. 23 is described.

FIG. 24 is a diagram illustrating a manner of processing (manufacturing) the blazed grating 201 illustrated in FIG. 23.

In FIG. 24, the concave diffraction element 102 is processed by cutting work using a turning tool 205 including a super hard tip or single crystal diamond tip 204 fixed to the end of a shank 203 by brazing or the like.

The shank 203 of the turning tool 205 is fixed to a main shaft of NC machine tools (not shown) and is driven to rotate about a rotation axis 206 of the main shaft so that the blazed grating 201 having a blazed angle θ is processed by cutting work so as to have a desired shape by fly-cutting processing.

Note that the main shaft of the NC machine tools or the concave diffraction element 102 is moved in the direction perpendicular to the paper face, so as to form the diffraction grating 201 having lines parallel to the z axis as illustrated in FIG. 22, when viewed from X-axis direction shown in FIG. 21.

However, when the diffraction grating 201 is processed on the "z-toric surface" as illustrated in FIG. 21, the following problem occurs.

FIG. 25 illustrates a schematic view of the processing of the diffraction gratings on the z-toric surface at the point P which is in the xy plane with z=0. When processing the diffraction gratings at the point P, the rotation axis 206 of the main shaft for rotating the turning tool 205 exists in xy plane. And if the main shaft for rotating the turning tool 205 is rotated about a straight line M which is orthogonal to the straight line L connecting the origin O and the point P and exists in xy plane, the diffraction grating can be formed on the z-toric surface as a line N illustrated in FIG. 25.

If the diffraction gratings are formed in this manner, the rotation axis 206 of the main shaft for rotating the turning tool 205 and the direction of the movement of the turning tool 205 are constantly orthogonal to each other. Therefore, the diffraction gratings N can be formed by fly-cutting processing to have a desired section form as blazed gratings constantly having a blazed angle θ shown in FIG. 24 at any point.

FIG. 26 shows the diffraction gratings viewed from X-direction where the diffraction gratings are formed by the method described above. As can be understood from FIG. 26, if the diffraction gratings are observed from the X-axis direction, the diffraction gratings can be observed as curved lines concave to the origin point side except a diffraction grating on a xz plane with y=0 which can be observed as a straight line.

This is because the diffraction gratings are formed by rotating the rotation axis 206 of the main shaft for rotating the turning tool 205 about a straight line M which is orthogonal to the straight line L connecting the origin O and the point P and exists in xy plane. All the diffraction gratings formed in this manner can be observed as straight lines only when viewed from the origin O.

A spectroscopic analysis by use of the diffraction gratings illustrated in FIG. 26 causes a problem in which the precision in spectroscopy is deteriorated due to the difference in pitch of the diffraction gratings depending on the distance from the xy plane with z=0 as can be understood from FIG. 26.

Therefore, the diffraction gratings generally need to be formed to be parallel to each other and to have the same interval therebetween when viewed from X-axis direction as illustrated in FIG. 22.

Diffraction gratings N which are formed on the z-toric surface shown in FIG. 25 and can be observed as straight lines when viewed from X-axis direction, can be observed as illustrated in FIG. 27 when viewed from the origin O. So, if the diffraction gratings are formed so that the diffraction gratings can be observed not as straight lines but as curves convex to the origin side when viewed from the origin O as shown in FIG. 27, the formed diffraction gratings can be observed as straight lines when viewed from X-axis direction. This can be readily understood from a simple geometric consideration.

Such processing of the diffraction gratings cannot be performed by the method described with reference to FIG. 25 but can be performed by a method which will be described below with reference to FIG. 28. The rotation axis 206 of the main shaft for rotating the turning tool 205 is in xy plane when processing the diffraction grating at the point P as illustrated in FIG. 28. The diffraction gratings illustrated in FIG. 27 can be formed by rotating the rotation axis 206 of the main shaft for rotating the turning tool 205 about a straight line M which is orthogonal to the straight line L connecting the origin O and the point P and is in xy plane and simultaneously by moving the rotation axis 206 of the main shaft in the Y-axis direction.

However, in a diffraction gratings formed by such processing, at any point except the point P, since the rotation axis 206 of the main shaft for rotating the turning tool 205 and the movement direction of the turning tool 205 are not orthogonal to each other, the wall portion 207 of the diffraction grating shown in FIG. 24 is cut out by the rotation of the turning tool 205 so that the wall portion 207 is not formed perpendicularly.

FIG. 29 shows a schematic diagram of the processing of the diffraction grating at point Q apart from the point P in the z-axis direction (see FIG. 27). The turning tool 205 is rotated about the rotation axis 206 to thereby perform the fly-cutting processing of the diffraction gratings. When processing the diffraction grating at the point Q, the turning tool 205 is moved in the direction indicated by an arrow illustrated in FIG. 29 (in the tangential direction of the wall portion 207 of the diffraction grating). As a result, since the rotation axis 206 of the main shaft for rotating the turning tool 205 and the movement direction of the turning tool 205 are not orthogonal to each other, the wall portion 207 of the diffraction grating is cut out by the rotation of the turning tool 205 so that the wall portion 207 is not formed perpendicularly.

FIG. 30 is a cross sectional view of the diffraction grating processed in the state as illustrated in FIG. 29.

Because the locus of the wall portion 207 of the diffraction grating 201 (i.e., movement direction of the turning tool 205) is not orthogonal to the rotation axis 206 of the main shaft for rotating the turning tool 205, the wall portion 207 of the diffraction grating 201 is cut out by the rotation of the turning tool 205 as illustrated in FIG. 30.

In this way, if the concave shape of the conventional concave diffraction element 102 is set as the so-called general toric surface ("z-toric surface") so as to form an image appropriately in both the spectral direction and the direction orthogonal to the spectral direction, the following problem occurs. As a processing problem, the wall portion 207 of the diffraction grating 201 does not have a desired shape, and hence diffraction efficiency is lowered. Further, undesired diffracted light increases, and hence a problem of flare or the like occurs.

SUMMARY OF THE INVENTION

It is an object of the present invention to provide a highly accurate diffraction element that may prevent an intensity decrease of a light beam entering a light receiving unit without a decrease in diffraction efficiency and without a problem of flare or the like, a manufacturing method for the diffraction element, and a spectrometer using the same.

According to one aspect of the present invention, there is provided a diffraction element including a diffraction grating formed on a substrate having a curved surface, in which; the curved surface has an anamorphic shape formed by pivoting a curved line (I) in a plane about a straight line (II) in the same plane serving as a rotation axis, and each of gratings constituting the diffraction grating exist in a cross section orthogonal to the rotation axis.

According to a further aspect of the present invention, in the diffraction element, the curved surface on which the diffraction grating is formed includes a concave surface.

According to a further aspect of the present invention, in the diffraction element, the anamorphic shape is characterised in that a curvature radius (R) in an arrangement direction of the gratings is larger than a curvature radius (r) in an extending direction of the gratings.

According to a further aspect of the present invention, in the diffraction element, the diffraction grating includes a reflective blazed grating.

According to a further aspect of the present invention, in the diffraction element, the diffraction grating is manufactured by direct cutting work of the substrate using a working tool.

According to a further aspect of the present invention, the diffraction element is manufactured by injection molding using a mold having a surface on which the diffraction grating is formed.

According to a further aspect of the present invention, the diffraction element is manufactured by replica molding using a mold having a surface on which the diffraction grating is formed.

According to another aspect of the present invention, there is provided a spectrometer including; the diffraction element set out in the foregoing, an incident light introducing unit disposed on a Rowland circle of the diffraction grating of the diffraction element, for guiding light to enter the diffraction grating; and a light receiving unit disposed on a part of the Rowland circle of the diffraction grating of the diffraction element, for receiving light spectrally divided by wavelengths by the diffraction element.

According to still another aspect of the present invention, there is provided a method of manufacturing of the diffraction element set out in the foregoing, the method including; performing cutting work by rotating a working tool about a rotation axis (III) in the plane within a finite rotation radius; and performing cutting work by rotating the rotation axis (III), to which the working tool is attached in a rotatable manner, about the straight line (II) serving as the rotation axis.

According to yet another aspect of the present invention, there is provided a method of manufacturing of a mold to be used for the diffraction element set out in the foregoing, the method including, performing cutting work by rotating a working tool about a rotation axis (III) in the plane within a finite rotation radius, and performing cutting work by rotating the rotation axis (III), to which the working tool is attached in a rotatable manner, about the straight line (II) serving as the rotation axis.

According to yet another aspect of the present invention, there is provided a color image forming apparatus including; optical scanning apparatuses, multiple photosensitive members disposed on surfaces to be scanned of the optical scanning apparatuses, for forming different color images a developing device for developing an electrostatic latent image formed on each of the multiple photosensitive members as a toner image, a transferring device for transferring the developed toner image to a transfer material a fixing device for fixing the transferred toner image on the transfer material, and the spectrometer set out in the foregoing, in which the spectrometer performs spectral analysis for light reflected from the toner image fixed on the transfer material.

According to the present invention, the highly accurate diffraction element that may prevent the intensity decrease of the light beam entering the light receiving unit without the decrease in diffraction efficiency and without the problem of flare or the like, the manufacturing method for the diffraction element, and the spectrometer using the same may be provided.

Further features of the present invention will become apparent from the following description of exemplary embodiments with reference to the attached drawings.

DESCRIPTION OF THE EMBODIMENTS

A diffraction element of the present invention has a diffraction grating formed on a curved surface of a substrate. The curved surface has an anamorphic shape illustrated in FIG. 3 that is formed when a curved line (I) on a plane is pivoted about a straight line (II) on the same plane as a rotation axis. Grating lines of the diffraction grating exist in the cross sections orthogonal to the rotation axis (II).

Hereinafter, an embodiment of the present invention is described with reference to the attached drawings.

Embodiment

Figure 1:
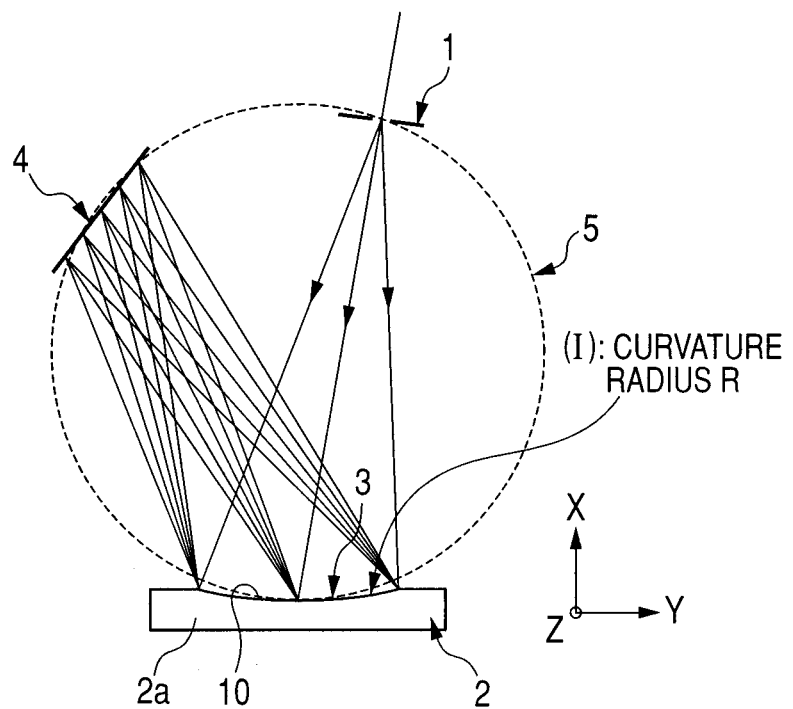
FIG. 1 is a principal part cross sectional view of a spectrometer in a spectral direction according to an embodiment of the present invention.

FIG. 1 is a principal part cross sectional view of a spectrometer in a spectral direction which uses a diffraction element according to an embodiment of the present invention.

In FIG. 1, an incident slit 1 as an incident light introducing unit allows a light beam (light) from a subject (toner image) for spectral measurement, for example, to enter a diffraction element 2 that is described later. In this embodiment, the incident slit 1 is disposed on a part of a Rowland circle of the diffraction element 2 as described later.

The diffraction element 2 has a diffraction grating 10 (constituted of multiple gratings) formed on a curved surface (surface) 3 of a substrate 2a, in which fine grooves are formed in the direction perpendicular to the paper face. In addition, the curved surface 3 on which the diffraction grating 10 is formed is a concave surface.

The diffraction element 2 in this embodiment includes a reflective diffraction element. Hereinafter, the diffraction element 2 having a concave surface as the curved surface 3 is also referred to as a "concave diffraction element 2".

A light receiving unit 4 includes a one-dimensional array light detector such as a CCD (line sensor). In this embodiment, the light beams are reflected and diffracted (in a spectral manner) by the diffraction element 2 in different angles for respective wavelengths, which enter individual light receiving elements of the light detector 4 so that intensity thereof are measured as the spectral measurement.

A Rowland circle 5 is defined as a circle which passes through the center of the concave diffraction element 2 and has a diameter equal to a curvature radius of the concave diffraction element 2.

In this embodiment, the light beam that enters through the incident slit 1 on the Rowland circle 5 is reflected and diffracted by the concave diffraction element so as to form an image on the Rowland circle 5. Therefore, in this embodiment, in order to perform highly accurate spectral measurement, the incident slit 1 and the light detector 4 are disposed on a part of the Rowland circle 5.

A shape of the curved line (I) in the cross section of the surface 3 in the spectral direction (Y direction), in which the diffraction grating 10 of the concave diffraction element 2 of this embodiment is formed, is an arc shape having a curvature radius R.

Figure 2:
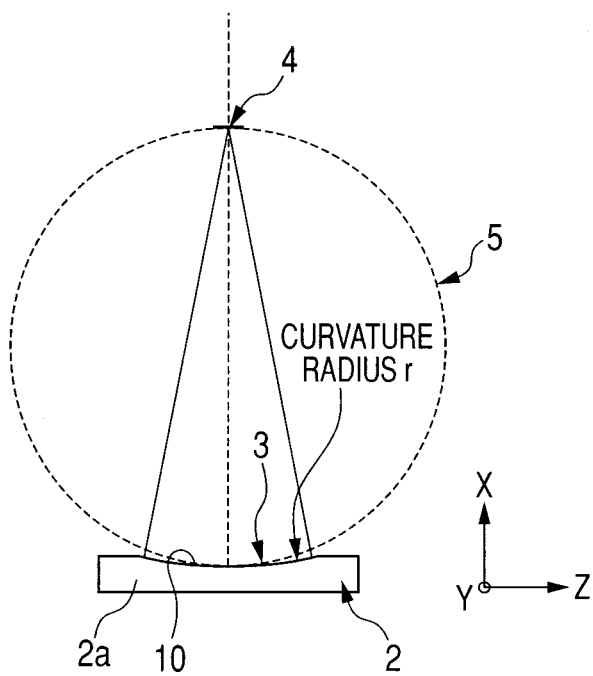
FIG. 2 is a principal part cross sectional view of the spectrometer in a direction orthogonal to the spectral direction according to the embodiment of the present invention.

FIG. 2 is a principal part cross sectional view of the spectrometer using the concave diffraction element 2 of the embodiment of the present invention, in a direction (Z direction) orthogonal to the spectral direction (arrangement direction of the gratings), i.e., a direction in which the grooves of the diffraction grating 10 extend. In FIG. 2, a component that is the same as the component illustrated in FIG. 1 is denoted by the same reference numeral.

Note that for avoiding complication in FIG. 2, the light path from the incident slit 1 to the concave diffraction element 2 illustrated in FIG. 1 is omitted.

A shape of the curved line in the cross section of the surface 3 in the direction orthogonal to the spectral direction, in which the diffraction grating 10 of the concave diffraction element 2 of this embodiment is formed, is an arc shape having a curvature radius r.

Here, as described above, in order to form an image appropriately on the light detector 4 also in the cross section in the direction orthogonal to the spectral direction, the curvature radius r of the cross section in the direction orthogonal to the spectral direction is set smaller than the curvature radius R of the cross section in the spectral direction.

Therefore, the surface 3 on which the diffraction grating 10 of the concave diffraction element 2 is formed is a toric surface in which the curvature radius R of the cross section in the spectral direction is different from the curvature radius r of the cross section in the direction orthogonal to the spectral direction.

Figure 3:
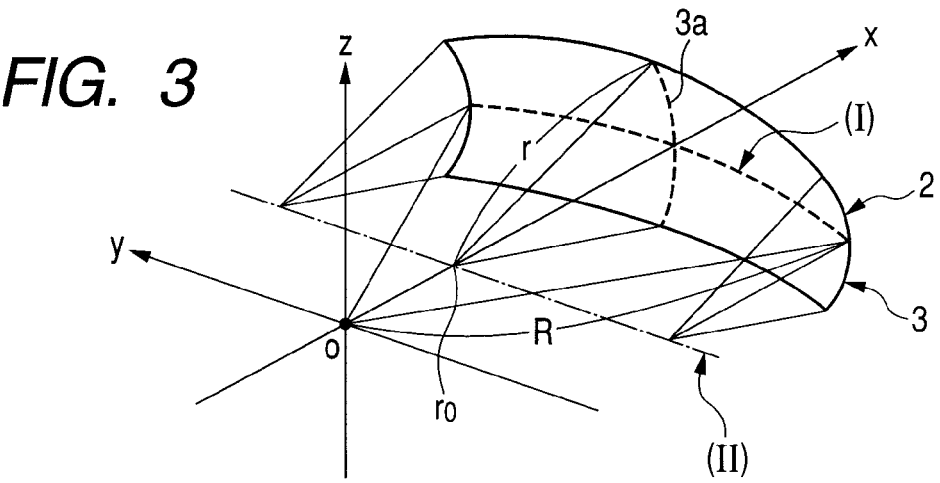
FIG. 3 is a diagram illustrating a shape of a toric surface according to the embodiment of the present invention.

FIG. 3 is a diagram illustrating a shape of the surface (curved surface) 3 on which the diffraction grating 10 illustrated in FIGS. 1 and 2 is formed. In FIG. 3, a component that is the same as the component illustrated in FIGS. 1 and 2 is denoted by the same reference numeral.

In FIG. 3, the surface 3 is the curved surface on which the diffraction grating of the concave diffraction element 2 is formed as described above, and a rectangular coordinate system is defined so that the xy plane corresponds to the cross section including the spectral direction (y-direction) illustrated in FIG. 1 while the zx plane corresponds to the cross section orthogonal to the spectral direction (y-direction) illustrated in FIG. 2.

Here, the shape of the surface 3 on which the diffraction grating of the concave diffraction element 2 is formed has a curved line 3a in the cross section (zx plane) orthogonal to the spectral direction, which is an arc having the curvature radius r. In addition, the curved line (I) in the cross section (xy plane) in the spectral direction is an arc having the curvature radius R.

Then, the curvature radius r in the cross section orthogonal to the spectral direction (in the zx plane) is smaller than the curvature radius R in the cross section (xy plane) including the spectral direction.

Further, the arc of the curvature radius R is set as follows. That is, the curved surface 3 of the concave diffraction element 2 is a toric surface obtained by rotating (pivoting) the curved line (I) about a rotation axis that is the straight line (II) that passes through a curvature center $r_0$ of the arc 3a having the curvature radius r in the cross section orthogonal to the spectral direction (in the zx plane) and is parallel to the y axis.

In other words, the curved surface 3 has an anamorphic shape formed by pivoting the curved line (I) on a plane about the straight line (II) on the same plane as a rotation axis as illustrated in FIG. 3.

In this specification, the toric surface like this embodiment is referred to as a "y-toric surface".

This embodiment is particularly characterized in that the shape of the surface 3 on which the diffraction grating of the concave diffraction element 2 is formed is the "y-toric surface" as described above with reference to FIG. 3.

Figure 4:
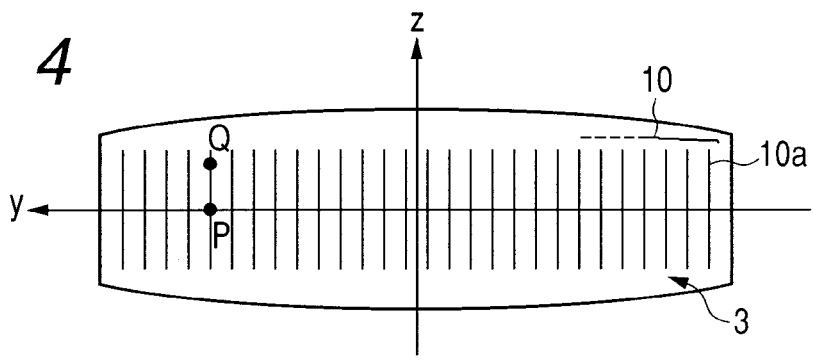
FIG. 4 is a diagram illustrating a pattern of a diffraction grating according to the embodiment of the present invention, when viewed from a direction of an origin.

FIG. 4 is a diagram illustrating a specific pattern of the diffraction grating 10 formed on the surface 3 of the concave diffraction element 2 of this embodiment, when viewed from a X-axis direction shown in FIG. 3.

The spectral direction of the concave diffraction element 2 is a direction in the xy plane illustrated in FIG. 3. Therefore, gratings 10a of the diffraction grating 10 on the surface 3 of the concave diffraction element 2 are seen as straight lines parallel to the z axis when the concave diffraction element 2 is viewed from the X-axis direction shown in FIG. 3.

In addition, the gratings 10a of the diffraction grating 10 exist in the individual cross sections orthogonal to the rotation axis (II).

The diffraction grating 10 formed on the concave diffraction element 2 of this embodiment is a blazed grating so as to improve diffraction efficiency.

Figure 5:
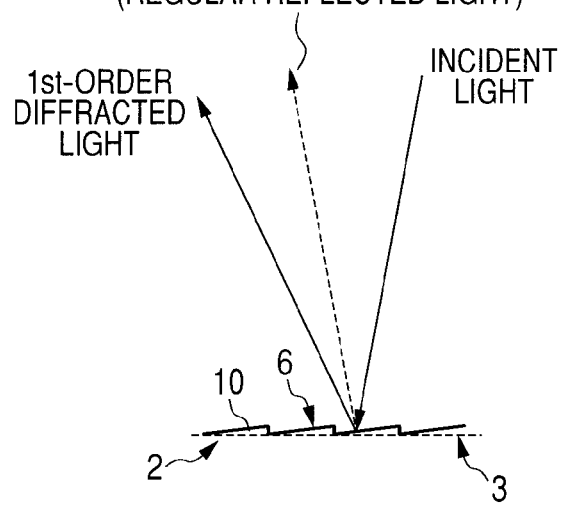
FIG. 5 is a diagram illustrating a structure of the diffraction grating of a concave diffraction element according to the embodiment of the present invention.

FIG. 5 is a diagram illustrating a structure of the diffraction grating 10 in the cross section including the spectral direction of the concave diffraction element 2 of this embodiment.

Incident light entering the concave diffraction element 2 is reflected and diffracted by the diffraction grating 10 formed on the surface 3. However, a first-order diffracted light is used for the spectral analysis. Hence, the blazed grating as illustrated in FIG. 5 is used, and oblique surfaces 6 of the diffraction grating 10 are inclined to the direction in which the first-order diffracted light is diffracted so that diffraction efficiency in the first-order diffracted light may be improved.

Next, a processing method (manufacturing method) of the blazed grating 10 of the concave diffraction element 2 illustrated in FIG. 5 is described.

Figure 6:
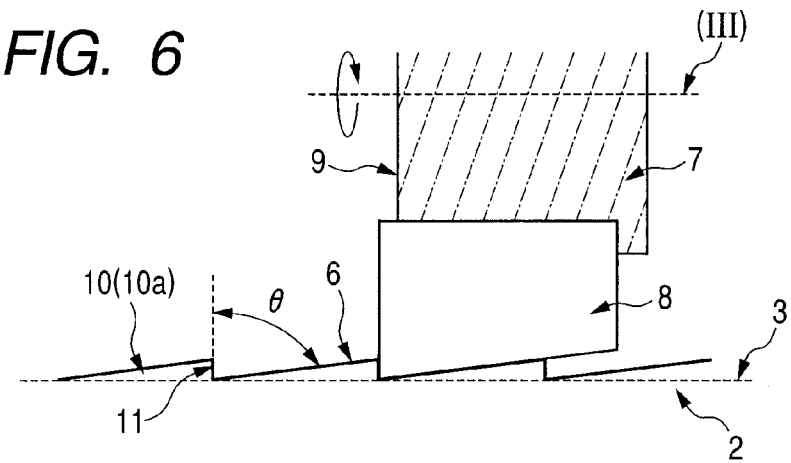
FIG. 6 is a diagram illustrating a manner of processing a blazed grating illustrated in FIG. 5.

FIG. 6 is a diagram illustrating a manner of processing (manufacturing) the blazed grating 10 illustrated in FIG. 5.

The blazed grating 10 of the concave diffraction element 2 of this embodiment is processed, as described below, in the step of performing cutting work by rotating a working tool about a rotation axis (III) in a plane with a finite rotation radius. Further, the straight line (II) is set as the rotation axis (III) to which the working tool is attached in a rotatable manner, and the working tool is rotated about the straight line (II) in the cutting work, to thereby process the blazed grating 10.

In this embodiment, the surface 3 on which the diffraction grating (blazed grating) 10 of the concave diffraction element 2 is formed is processed by cutting work using a turning tool 9 including a super hard tip or single crystal diamond tip 8 fixed to the end of a shank 7 by brazing or the like.

The shank 7 of the turning tool 9 is fixed to a main shaft of NC machine tools (not shown) and is driven to rotate about the rotation axis (III) of the main shaft so that the blazed grating 10 in which the oblique surface 6 of the diffraction grating 10 has a blazed angle θ is subjected to cutting work as fly-cutting processing.

Note that the main shaft of the NC machine tools or the concave diffraction element 2 is moved in the direction perpendicular to the paper face, so as to form the diffraction grating 10 having lines parallel to the z axis as illustrated in FIG. 5, when viewed from the X-axis direction shown in FIG. 3.

Figure 7:
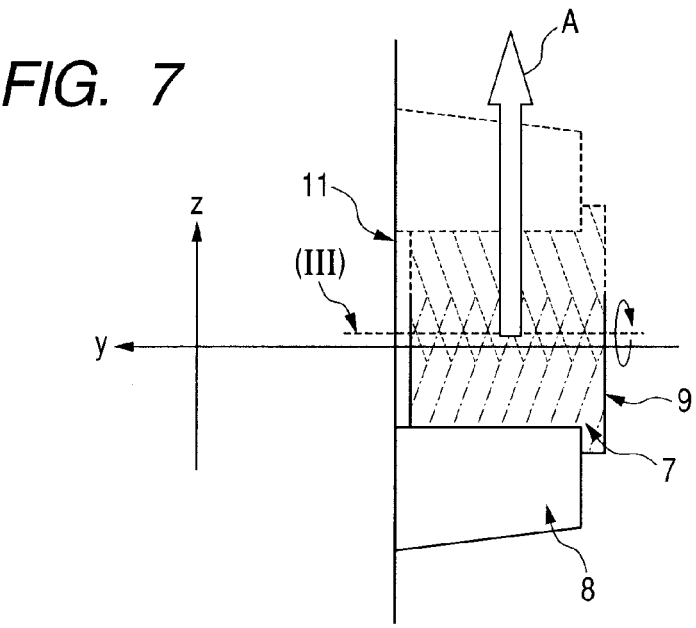
FIG. 7 is a diagram illustrating a manner of processing at the point P or the point Q.

FIG. 7 is a diagram illustrating a manner of processing at the point P or the point Q illustrated in FIG. 4, when viewed from the direction of the normal to the "y-toric surface" at the point P or the point Q.

In FIG. 7, the turning tool 9 is driven to rotate about the rotation axis (III) of the main shaft so that the super hard tip or single crystal diamond tip 8 fixed to the end of the shank 7 by brazing or the like performs cutting work as the fly-cutting processing.

Note that the main shaft of the NC machine tools is moved in the z axis direction as indicated by an arrow A of FIG. 7 so that the turning tool 9 forms the linear diffraction grating 10.

In FIG. 7, the wall portion 11 of the blazed grating 10 is to be processed as illustrated in FIG. 6.

In this embodiment, the locus of the wall portion 11 of the diffraction grating 10 (i.e., movement direction of the turning tool 9) is always orthogonal to the rotation axis (III) of the main shaft for rotating the turning tool 9 at both the point P and the point Q.

Figure 8:
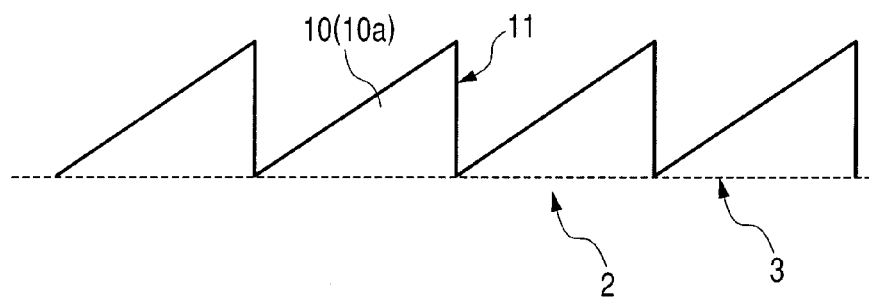
FIG. 8 is a diagram illustrating a wall portion of the diffraction grating that is processed to have an ideal shape as designed.

Therefore, as illustrated in FIG. 8, the wall portion 11 of the diffraction grating 10 may be processed to have an ideal shape as designed.

The reason for this is because the shape of the surface 3 on which the diffraction grating 10 of the concave diffraction element 2 is formed is the "y-toric surface" as described above with reference to FIG. 3.

In other words, it is because the shape of the surface 3 on which the diffraction grating 10 of the concave diffraction element 2 is formed is an arc having the curvature radius R. In other words, in this embodiment, the surface 3 is a toric surface obtained by rotating the curved line (I) about a rotation axis that is the straight line (II) that passes through the curvature center of the arc having the curvature radius r in the cross section (zx plane) orthogonal to the spectral direction and is parallel to the y axis.

Figure 9:
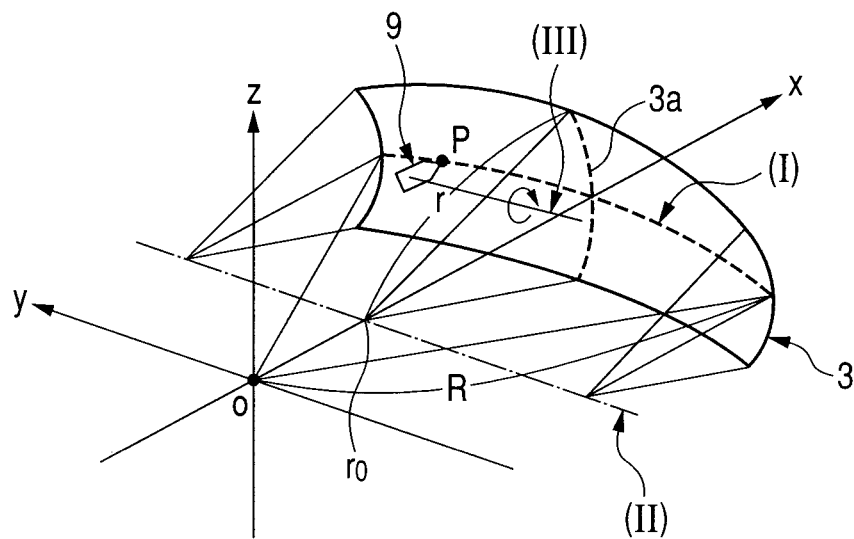
FIG. 9 is a perspective view illustrating a manner of processing the blazed grating of the concave diffraction element according to the embodiment of the present invention.

With reference to FIG. 9, further description is added. FIG. 9 is a principal part perspective view illustrating a manner of processing (manufacturing) the blazed grating (diffraction grating) 10 of the concave diffraction element 2 of this embodiment.

FIG. 9 illustrates a manner of processing at the point P illustrated in FIG. 4. Further, as illustrated in FIGS. 6 and 9, when the process is performed at the point P, the locus of the wall portion 11 of the diffraction grating (i.e., movement direction of the turning tool 9) is orthogonal to the rotation axis (III) of the main shaft for rotating the turning tool 9. Therefore, it may be easily understood that the wall portion 11 of the diffraction grating 10 may be processed to have an ideal shape as designed.

The turning tool 9 rotates about the rotation axis (III) of the main shaft so as to perform the process at the point P. Then, the rotation axis (III) of the main shaft of the turning tool 9 exists in the xy plane when the process is performed at the point P.

In addition, the point P also exists in the xy plane. In other words, when the process is performed at the point P, all the point P as the process point, the rotation axis (III) of the main shaft of the turning tool 9, and the rotation axis (II) about which the curved line (I) is rotated for defining the surface 3 on which the blazed grating 10 is formed (i.e., "y-toric surface") are on the same plane.

Here, the "y-toric surface" is defined, as described above, as a surface obtained by rotating the arc having the curvature radius R, i.e., the curved line (I) about the rotation axis that is the straight line (II) that passes through the curvature center $r_0$ of the arc 3a having the curvature radius r in the cross section (zx plane) orthogonal to the spectral direction and is parallel to the y axis.

Therefore, the rotation axis (III) of the main shaft of the turning tool 9 only needs to be rotated about the rotation axis (II) while maintaining a relative positional relationship between the rotation axis (III) of the main shaft of the turning tool 9 and the rotation axis (II) about which the curved line (I) is rotated for defining the "y-toric surface". In other words, if the rotation axis (III) is rotated about the rotation axis (II), the locus of the wall portion 11 of the diffraction grating (i.e., movement direction of the turning tool 9) is orthogonal to the rotation axis (III) of the main shaft for rotating the turning tool 9 also when the process is performed at the point Q of FIG. 4.

Therefore, it may be understood that the wall portion 11 of the diffraction grating 10 may be processed to have an ideal shape as designed also when the process is performed at the point Q of FIG. 4.

As described above, in this embodiment, the shape of the surface 3 on which the diffraction grating 10 of the concave diffraction element 2 is formed is set as follows. The curved line in the cross section (zx plane) orthogonal to the spectral direction is set as an arc having the curvature radius r, and the curved line (I) in the cross section (xy plane) in the spectral direction is set as an arc having the curvature radius R.

Further, the curvature radius r in the cross section (zx plane) orthogonal to the spectral direction is set to be smaller than the curvature radius R in the cross section (xy plane) including the spectral direction.

Further, the arc having the curvature radius R, i.e., curved line (I) is rotated about the rotation axis that is the straight line (II) that passes through the curvature center of the arc having the curvature radius r in the cross section (zx plane) orthogonal to the spectral direction and is parallel to the y axis so as to obtain the toric surface.

Thus, the ideal blazed grating 10 may be processed as designed in every position on the surface 3.

Further, in the concave diffraction element 2 processed by the above-mentioned processing method, the wall portion 11 of the blazed grating 10 is not cut out by the rotation of the turning tool 9. Therefore, there is no malfunction that diffraction efficiency is lowered.

Further, undesired diffracted light does not increase. Therefore, a problem of flare or the like does not occur, and hence a high-quality diffraction element and a spectrometer using the same may be obtained.

Table 1 shows characteristics of an optical system of the spectrometer in which the concave diffraction element 2 of this embodiment is used.

TABLE 1

| | | | |
|---|---|---|---|
| Working reference wavelength | $\lambda 0$ | nm | 550 |
| Working wavelength range | $\lambda$ | nm | 350-750 |
| Distance between incident slit and diffraction surface | d1 | mm | 12.35000 |
| Distance between diffraction surface and light receiving element | d2 | mm | 11.67000 |
| Light incident angle | $\alpha$ | Degree | 9.00000 |
| Light diffraction angle (reference wavelength) | $\beta$ | Degree | 11.74000 |
| Diffraction surface curvature radius (spectral direction) | R | mm | 12.50000 |
| Diffraction surface curvature radius (direction orthogonal to spectral direction) | r | mm | 11.00000 |

Figure 10:
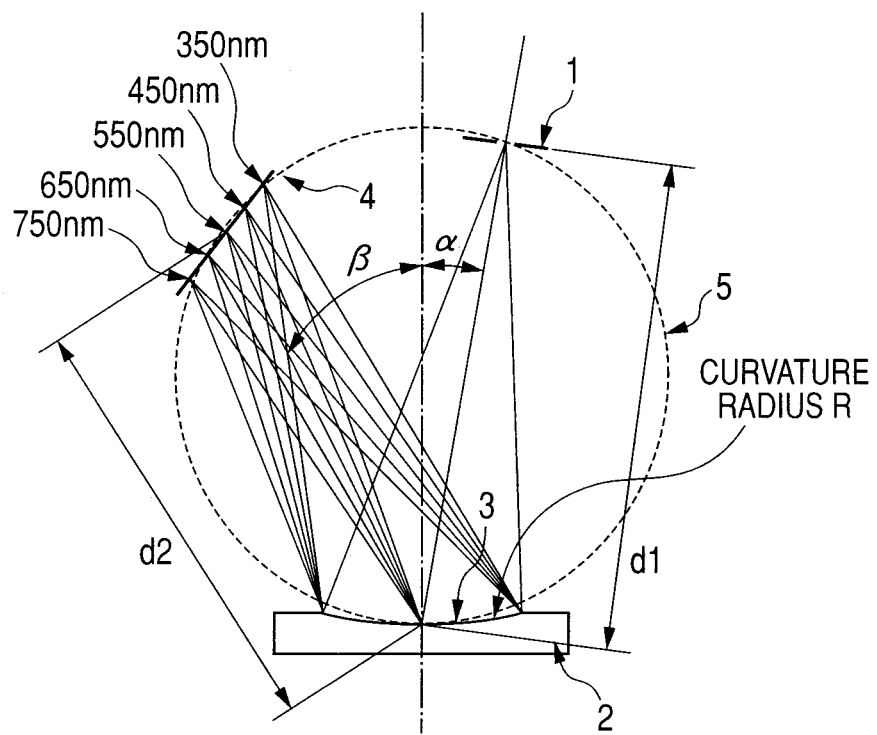
FIG. 10 is a diagram illustrating parameters in the embodiment of the present invention.

FIG. 10 is a diagram illustrating meanings of parameters in this embodiment. In FIG. 10, a distance between the incident slit 1 and the diffraction surface (curved surface) 3 is denoted by d1, a distance between the diffraction surface 3 and the light receiving element 4 is denoted by d2, a light incident angle is denoted by $\alpha$, and a light diffraction angle (reference wavelength) is denoted by $\beta$.

The spectrometer of this embodiment has a structure for performing the spectral analysis in the wavelength range from 350 to 750 nm by using the light beam having a reference wavelength of 550 nm.

The light beam passing through the incident slit 1 disposed on a part of the Rowland circle 5 enters the surface 3 on which the blazed grating (diffraction grating) 10 of the concave diffraction element 2 is formed, at an incident angle of 9.0 degrees.

The light beam entering the surface 3 is reflected and diffracted by the blazed grating 10 formed on the surface 3. Then, the light beam having the reference wavelength of 550 nm is diffracted by the diffraction angle of 11.74 degrees so as to be condensed (form an image) on the light receiving unit (light receiving element) 4 such as a CCD.

In FIG. 10, there are also illustrated light paths of light beams having wavelengths of 350 nm, 450 nm, 650 nm and 750 nm in addition to 550 nm that are reflected and diffracted so as to be condensed on the light receiving element 4.

The spectrometer of this embodiment performs the spectral analysis by measuring intensity distribution of light beams having individual wavelengths condensed on the light receiving element 4 such as a CCD.

Figure 11:
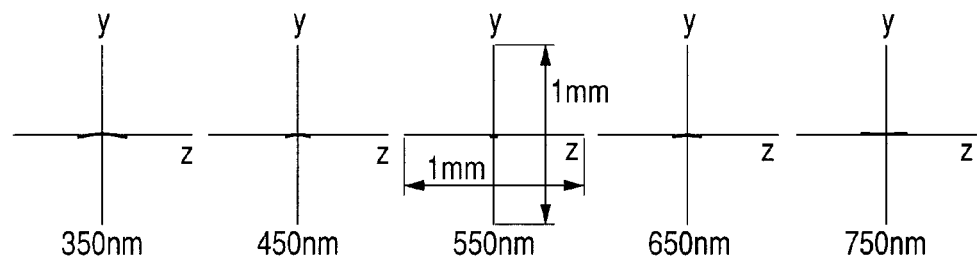
FIG. 11 is a diagram illustrating states of condensed light beams of individual wavelengths condensed on a light receiving unit according to the embodiment of the present invention.

FIG. 11 illustrates states of condensed light beams of individual wavelengths condensed on the light receiving element 4. The y direction represents the spectral direction while the z direction represents the direction orthogonal to the spectral direction.

In this embodiment, the shape of the surface 3 on which the blazed grating 10 of the concave diffraction element 2 is formed is set as follows. The curved line in the cross section (zx plane) orthogonal to the spectral direction is set as an arc having a curvature radius of 11.0 mm, and the curved line (I) in the cross section (xy plane) in the spectral direction is set as an arc having a curvature radius of 12.5 mm.

With this structure, light condensing performance in the direction orthogonal to the spectral direction (z direction of FIG. 11) is improved.

Comparative Example 1

Next, Comparative Example 1 of the present invention is described.

Figure 12:
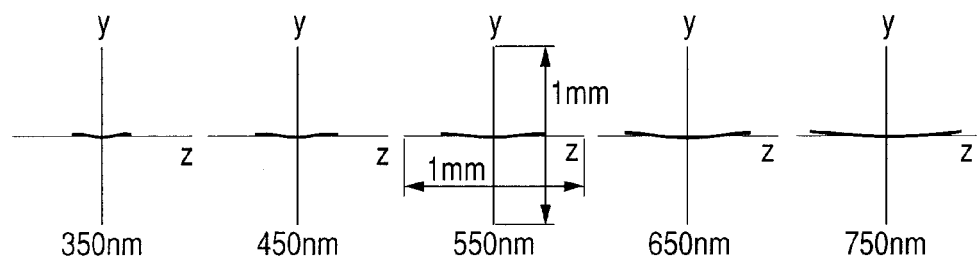
FIG. 12 is a diagram illustrating states of condensed light beams of individual wavelengths condensed on a light receiving unit according to a comparative example of the present invention.

As Comparative Example 1, FIG. 12 illustrates states of condensed light beams having individual wavelengths condensed on the light receiving element 4 in the case where the curvature radius is 12.5 mm in both the spectral direction and the direction orthogonal to the spectral direction.

It is understood that the light beams are condensed appropriately in the spectral direction, but light condensing performance in the direction orthogonal to the spectral direction is not as good as described above with reference to FIG. 11.

Figure 13:
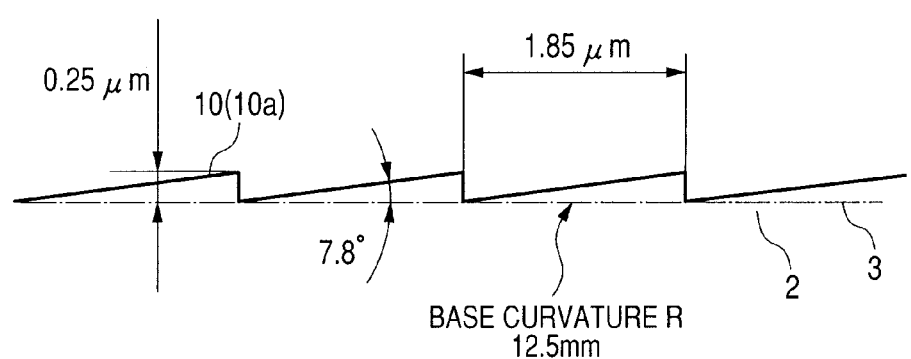
FIG. 13 is a diagram illustrating a shape of the blazed grating formed on the concave diffraction element according to the embodiment of the present invention.

FIG. 13 illustrates a detailed shape of the blazed grating 10 formed on the concave diffraction element 2 of this embodiment.

In the blazed grating 10 according to this embodiment, a pitch of each grating 10a is set to 1.85 μm, a height of the grating 10a is set to 0.25 μm, and an inclination of the oblique surface of the grating 10a is set to 7.8 degrees.

The blazed grating 10 formed on the concave diffraction element 2 of this embodiment may be processed to have an ideal shape as designed as described above.

Figure 14:
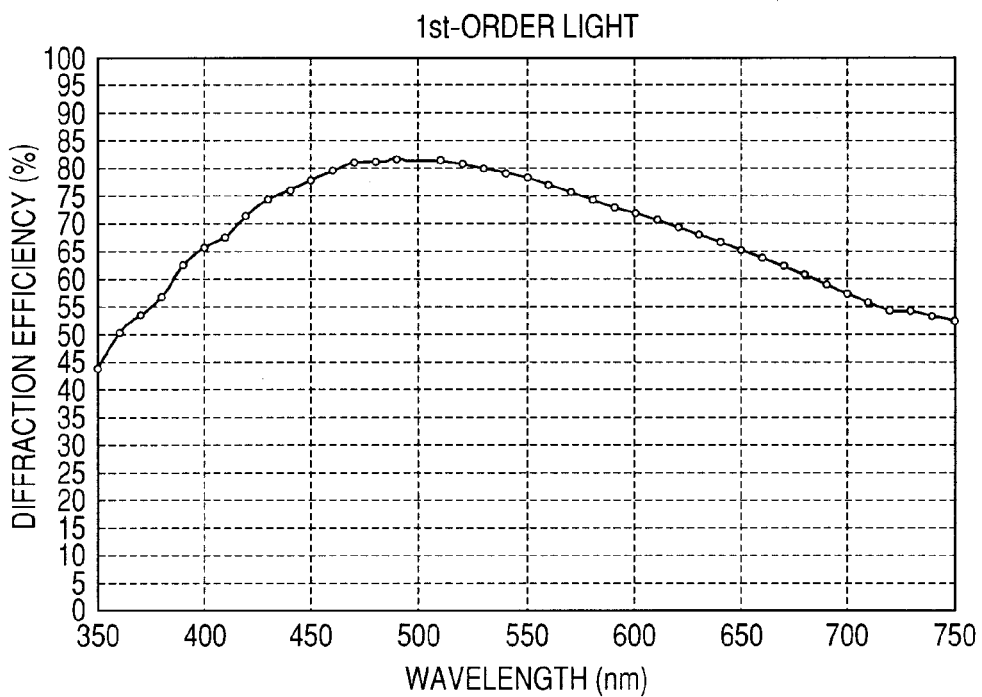
FIG. 14 is a graph illustrating diffraction efficiency according to the embodiment of the present invention.

The diffraction efficiency in the above-mentioned shape is illustrated in FIG. 14. It is understood from FIG. 14 that diffraction efficiency with good balance is obtained in the range from 350 to 750 nm.

Comparative Example 2

Figure 15:
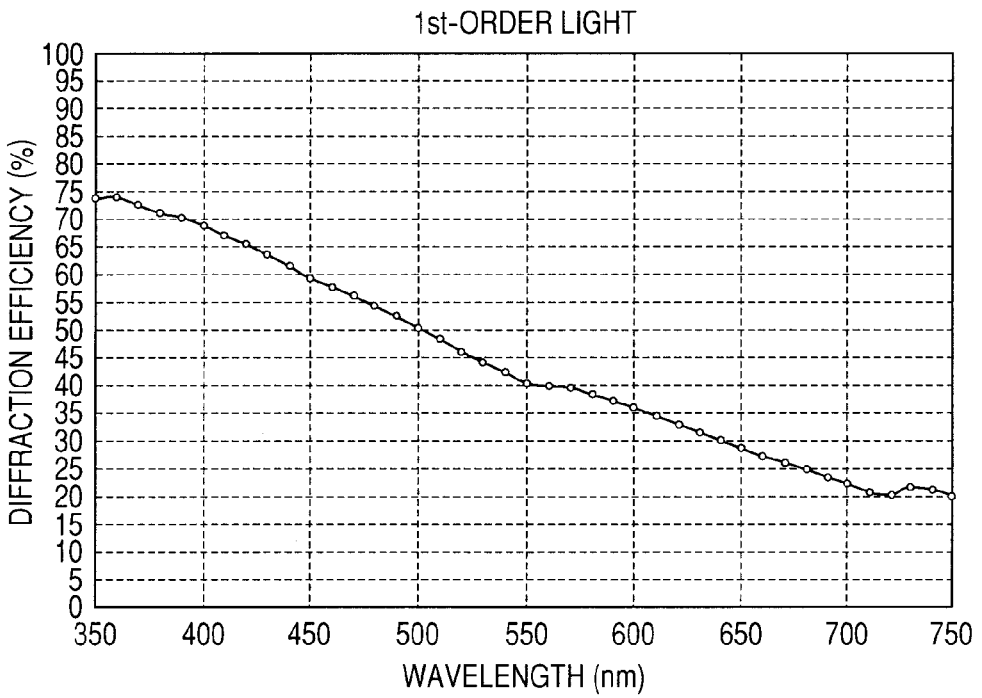
FIG. 15 is a graph illustrating diffraction efficiency in a case where a conventional general "z-toric surface" is processed to have a base shape.

In contrast, as Comparative Example 2, diffraction efficiency in the case where the process is performed on the base shape of the conventional general "z-toric surface" is illustrated in FIG. 15.

Figure 30:
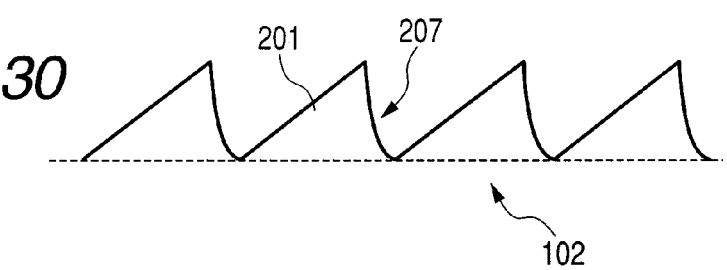
FIG. 30 is a diagram illustrating a conventional diffraction grating.

As described above (see FIG. 30), if the blazed grating 201 is processed on the "z-toric surface", the wall portion 207 of the blazed grating 201 is cut out so that desired diffraction efficiency may not be obtained.

As illustrated in FIG. 15, it is understood that a balance of diffraction efficiency in the range from 350 to 750 nm is significantly lost, and further the diffraction efficiency is also lowered.

In contrast, it may be understood that in this embodiment, diffraction efficiency with good balance is obtained in the range from 350 to 750 nm with a small decrease in diffraction efficiency because the process is performed on the base shape of the "y-toric surface".

As described above, the concave diffraction element 2 of this embodiment and the spectrometer using the same may provide a good imaging state in the direction orthogonal to the spectral direction and may prevent an intensity decrease of the light beam entering the light receiving element of the light detector. Further, by processing the wall portion 11 of the diffraction grating faithfully, the highly accurate diffraction element having no decrease in diffraction efficiency and no problem of flare or the like, the manufacturing method for the diffraction element, and the spectrometer using the same may be obtained.

The exemplary embodiment of the present invention is described above, but it is needless to say that the present invention is not limited to the embodiment, which may be modified and changed variously within the scope of the spirit thereof.

Note that in the case described above, the blazed grating 10 of the concave diffraction element 2 is manufactured (processed) by direct cutting work of the substrate using the working tool.

However, the present invention is not limited to this. A mold having a surface on which a diffraction grating is formed may be used for manufacturing the concave diffraction element 2 by injection molding or replica molding from a plastic material.

The process of injection molding or replica molding may be used because it may support mass production and easy supplying. In this case, a molding piece having a molding surface of the shape corresponding to the above-mentioned blazed grating 10 is used as a mold.

It may be easily understood that the processing described in this embodiment may be applied to the processing of the molding piece as it is.

(Color Image Forming Apparatus)

Figure 16:
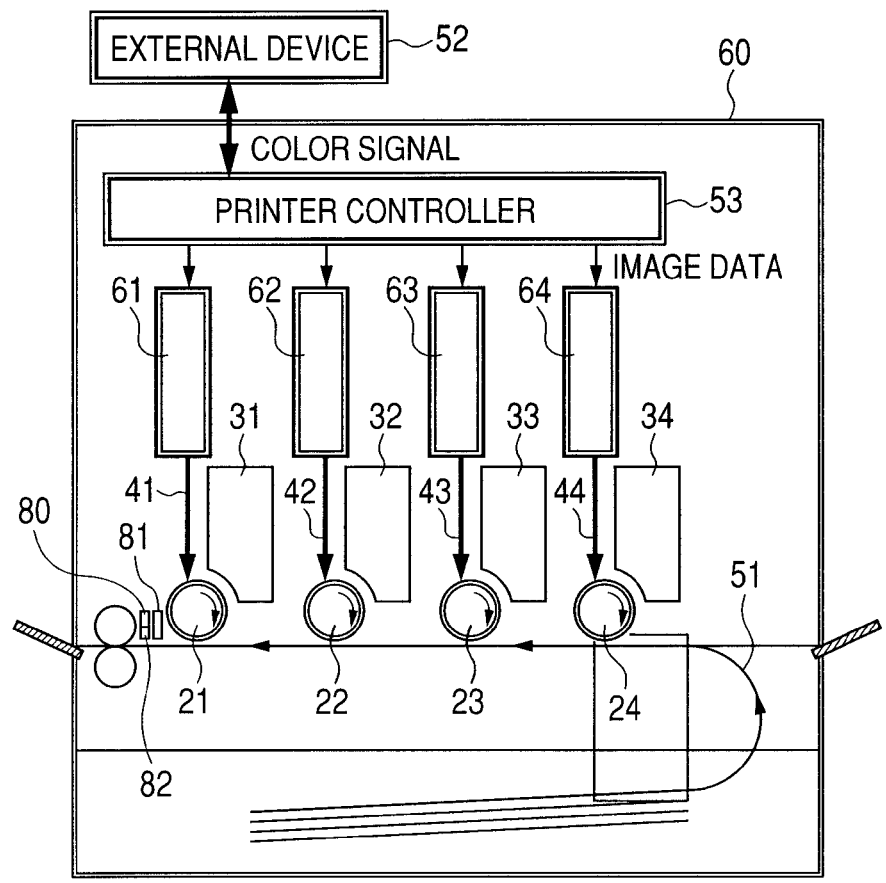
FIG. 16 is a principal part schematic diagram of a color image forming apparatus according to an embodiment of the present invention.

FIG. 16 is a principal part schematic diagram showing a color image forming apparatus according to an embodiment of the present invention.

This embodiment shows a tandem type color image forming apparatus in which four optical scanning apparatuses are arranged to record image information in parallel on surfaces of photosensitive drums, each of which serves as an image bearing member.

In more detail, the color image forming apparatus includes an optical scanning apparatuses and multiple photosensitive members disposed on the surfaces to be scanned of the optical scanning apparatuses so as to form different color images. Further, the color image forming apparatus includes a developing device for developing an electrostatic latent image formed on the photosensitive member as a toner image, a transferring device for transferring the developed toner image to a transfer material, a fixing device for fixing the transferred toner image on the transfer material, and the above-mentioned spectrometer. The toner image fixed on the transfer material is irradiated with the light beam from an illumination unit 81. Light reflected from the toner image is condensed by a condensing unit 82 onto the incident slit 1 of a spectrometer 80. Then, the spectrometer 80 performs the spectral analysis for the light reflected from the toner image fixed on the transfer material.

In FIG. 16, a color image forming apparatus 60 includes optical scanning apparatuses 61, 62, 63, and 64, photosensitive drums 21, 22, 23, and 24 each serving as an image bearing member, developing devices 31, 32, 33, and 34, and a transferring belt 51.

In FIG. 16, respective color signals of R (red), G (green), and B (blue) are input from an external device 52 such as a personal computer to the color image forming apparatus 60. The color signals are converted into respective image data (dot data) of C (cyan), M (magenta), Y (yellow), and B (black) by a printer controller 53 in the color image forming apparatus. Those image data each are input to the optical scanning apparatuses 61, 62, 63, and 64. Light beams 41, 42, 43, and 44, which are modulated according to the respective image data, are emitted from the optical scanning apparatuses. The photosensitive surfaces of the photosensitive drums 21, 22, 23, and 24 are scanned with the light beams in the main scanning direction.

According to the color image forming apparatus in this embodiment, as described above, the latent images of the respective colors are formed on the corresponding surfaces of the photosensitive drums 21, 22, 23, and 24 using the light beams based on the respective image data from the four optical scanning apparatuses 61, 62, 63, and 64. After that, the multi-transfer is performed on a recording material to produce a full color image.

As the external device 52, for example, a color image reading apparatus including a CCD sensor may be used. In this case, the color image reading apparatus and the color image forming apparatus 60 constitute a color digital copying machine.

Here, the full color image that is transferred on the recording material by the multi-transfer is read by the spectrometer 80 using the concave diffraction element 2 according to the embodiment of the present invention for performing the spectral analysis.

Then, if chromaticity obtained by the spectral analysis is shifted from desired chromaticity, intensity values of R (red), G (green) and B (blue) color signals from the external device 52 such as a personal computer are adjusted so that desired chromaticity may be obtained. Thus, the color image forming apparatus 60 that may produce an image of desired chromaticity may be realized.

Figure 17:
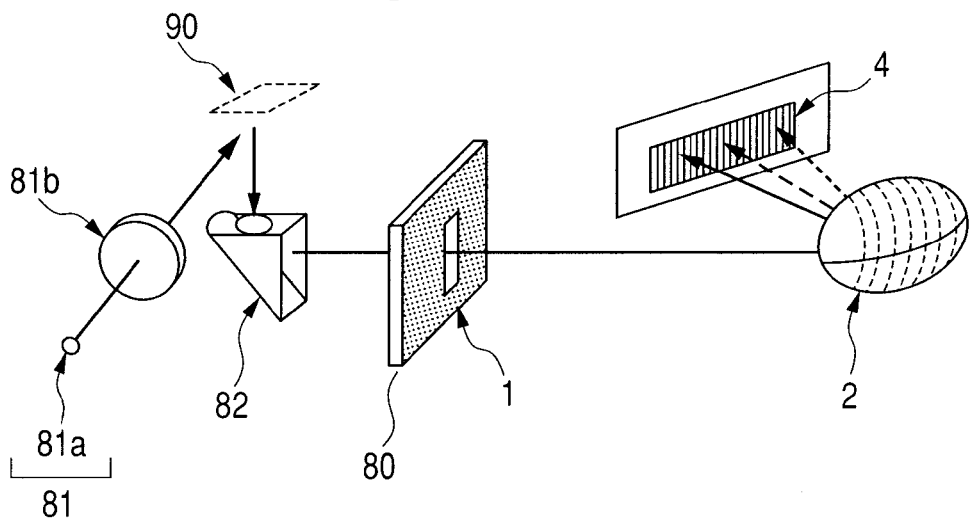
FIG. 17 is a principal part schematic diagram of a spectrometer according to an embodiment of the present invention.
Figure 18:
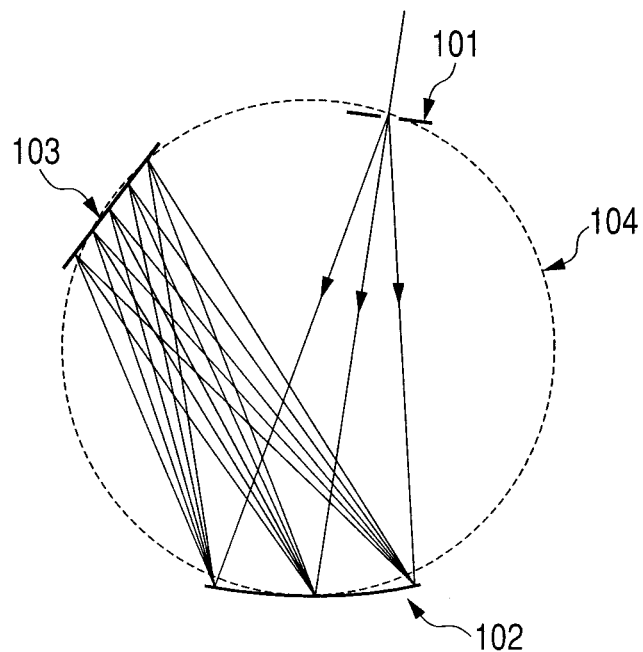
FIG. 18 is a principal part cross sectional view of a Rowland type spectrometer in a general spectral direction.
Figure 19:
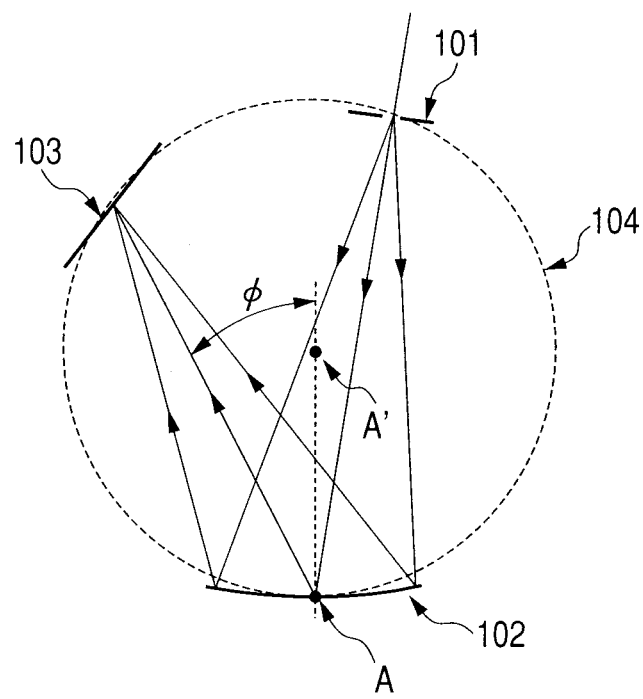
FIG. 19 is a diagram illustrating a conventional imaging state in a cross section in the spectral direction from an incident slit to a light detector.
Figure 20:
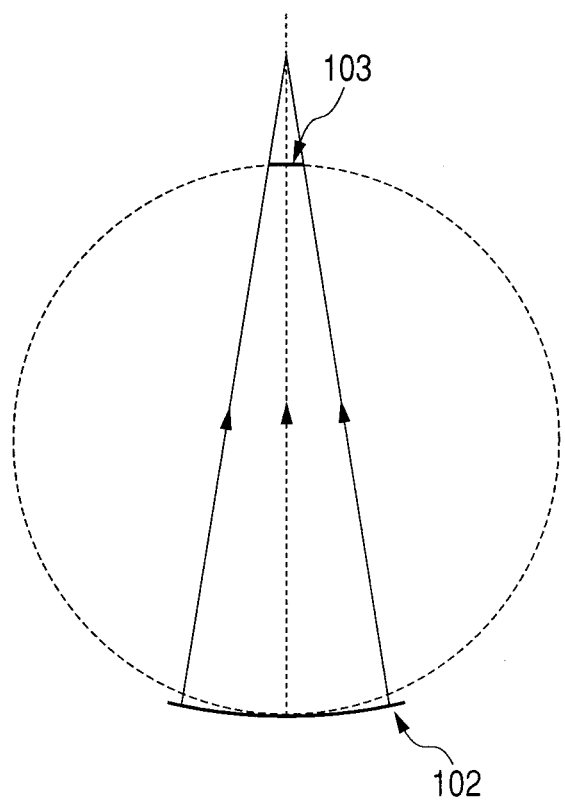
FIG. 20 is a diagram illustrating a conventional imaging state in a cross section in the direction orthogonal to the spectral direction from the concave diffraction element to the light detector.
Figure 21:
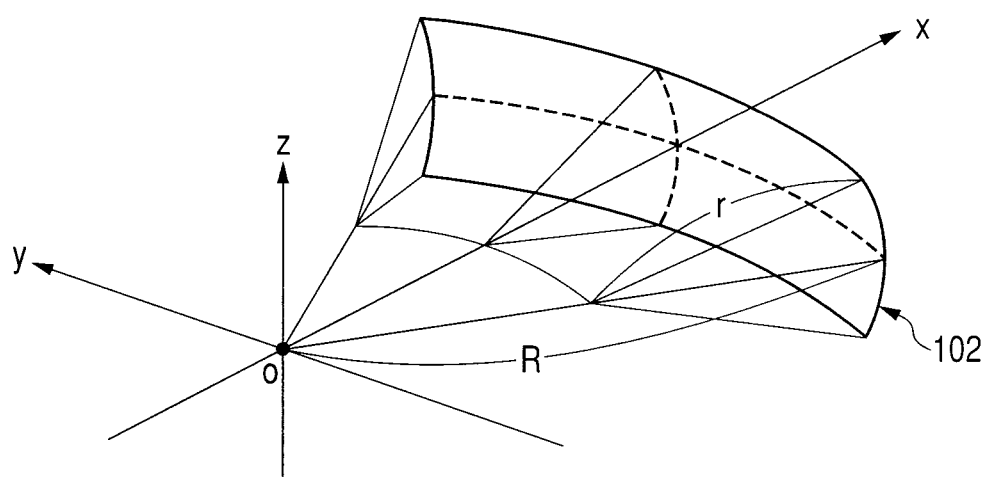
FIG. 21 is a diagram illustrating a toric surface of a conventional concave diffraction element.
Figure 22:
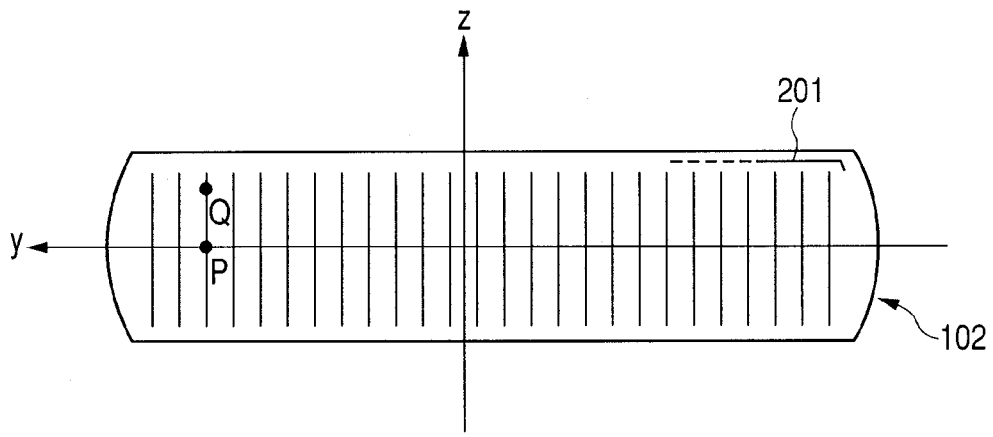
FIG. 22 is a diagram illustrating a specific pattern of a diffraction grating formed on the concave diffraction element when viewed from the direction of the origin.
Figure 23:
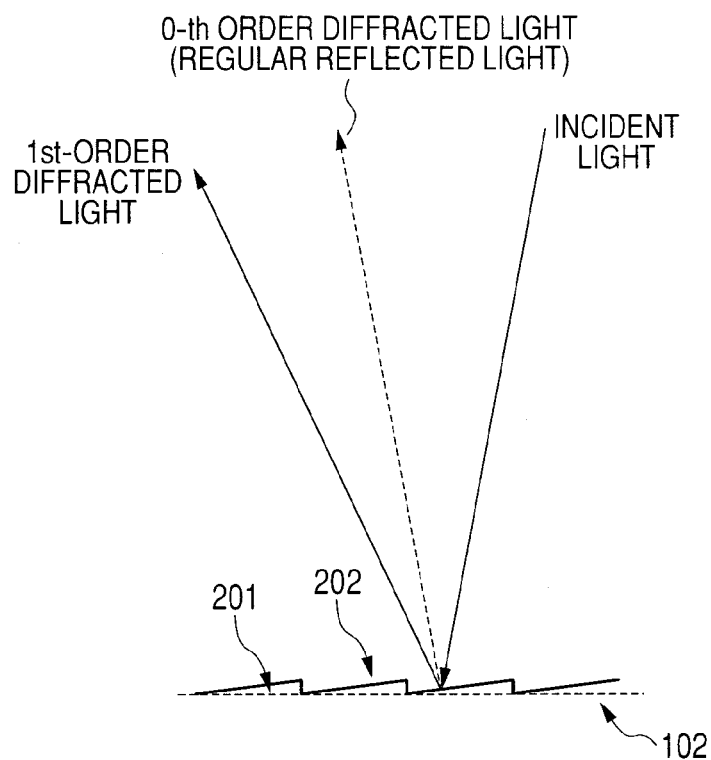
FIG. 23 is a diagram illustrating a structure of the diffraction grating in the cross section in the spectral direction of the concave diffraction element.
Figure 24:
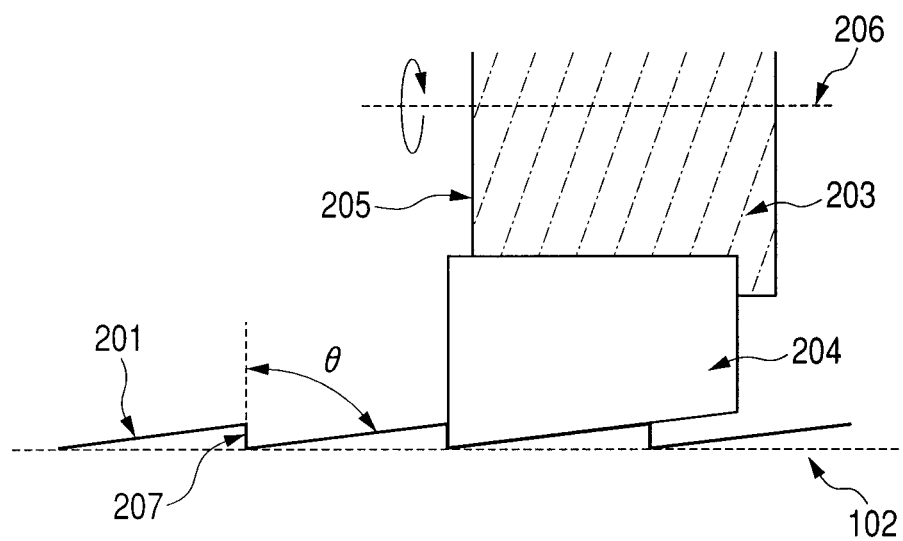
FIG. 24 is a diagram illustrating a manner of processing a blazed grating illustrated in FIG. 22.
Figure 25:
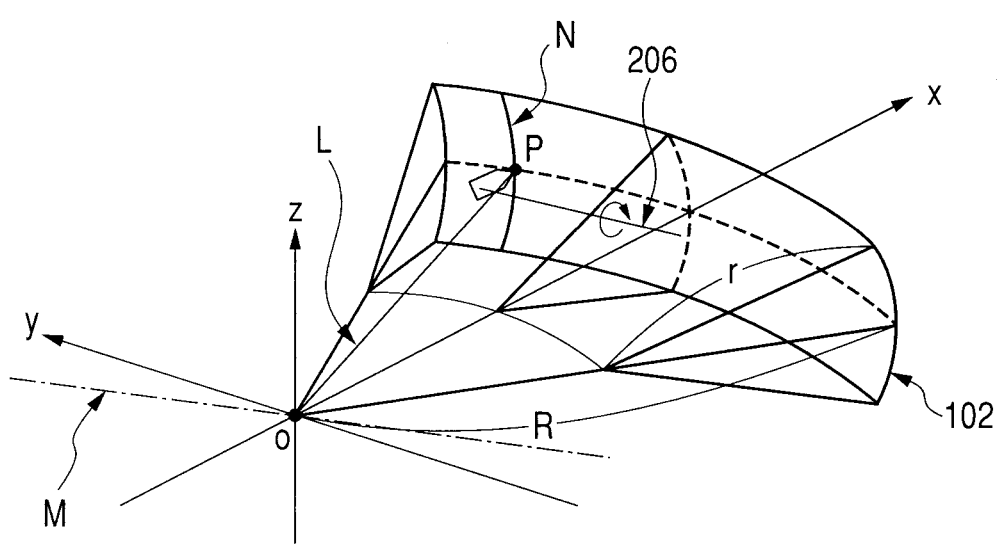
FIG. 25 is an example exemplifying a method of processing diffraction gratings on the z-toric surface.
Figure 26:
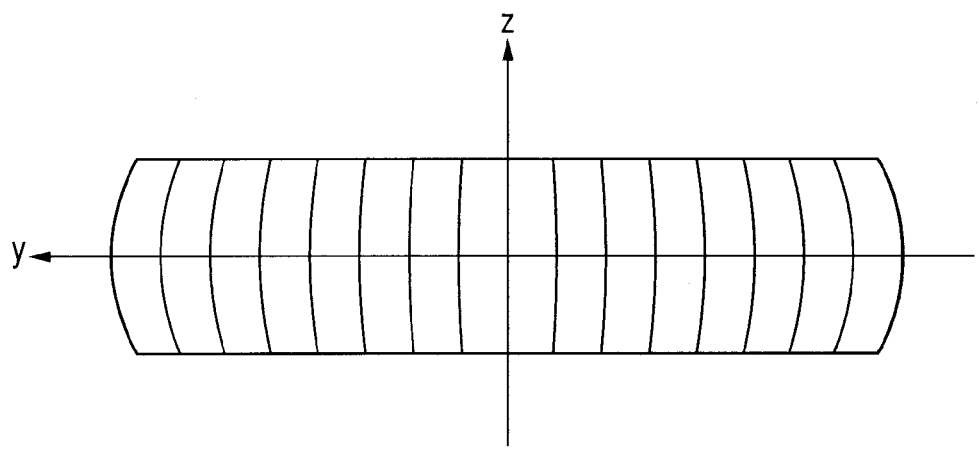
FIG. 26 illustrates the diffraction gratings viewed from the X-direction which is processed by the method illustrated in FIG. 25.
Figure 27:
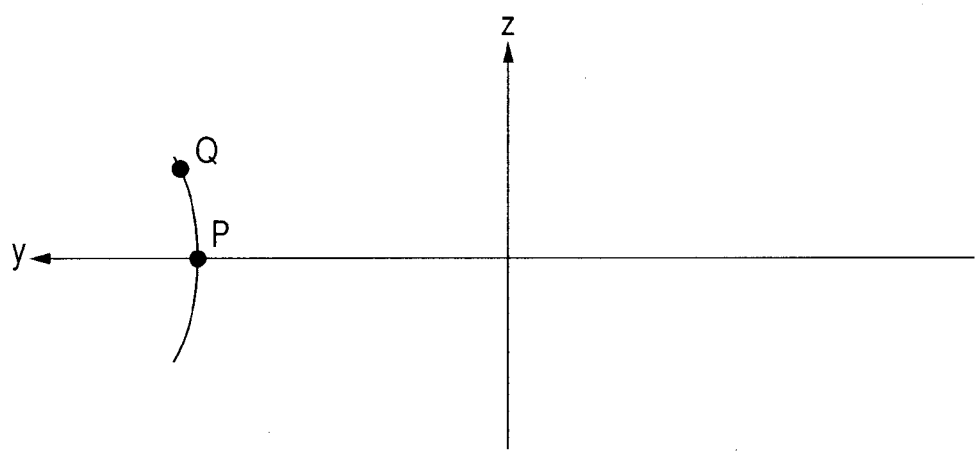
FIG. 27 illustrates diffraction gratings viewed from the origin O which can be seen as straight lines when viewed from the X-direction.
Figure 28:
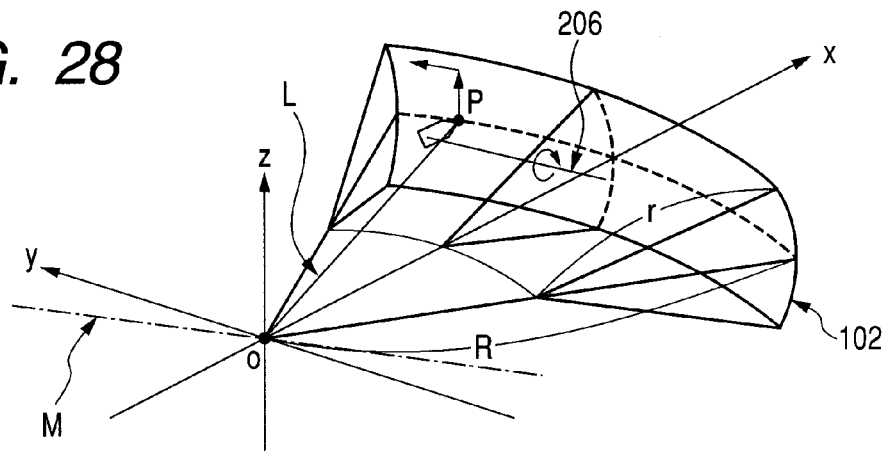
FIG. 28 illustrates the method of processing of the diffraction gratings formed on the z-toric surface.
Figure 29:
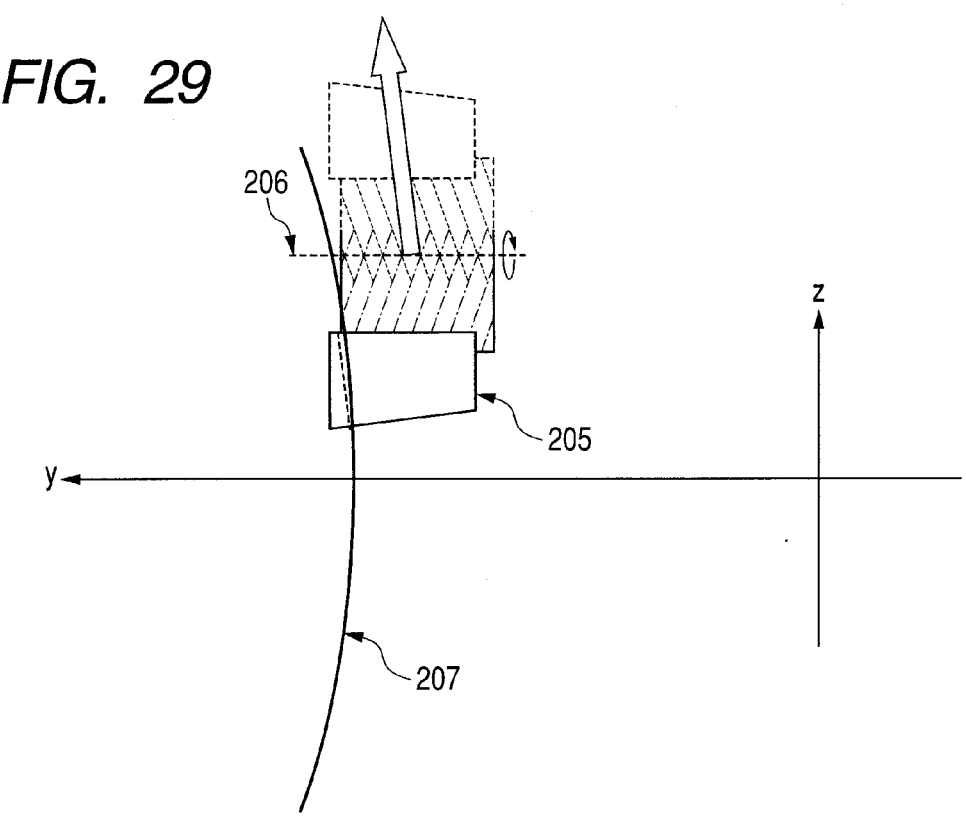
FIG. 29 illustrates the processing of the diffraction gratings at point Q formed on the z-toric surface.

FIG. 17 illustrates a specific structure from the illumination unit 81 to the spectrometer 80.

A toner image 90 is illuminated by the illumination unit 81a including a light source 81a such as an LED and an illumination lens 81b for guiding a light beam from the light source 81a to the toner image 90, and the light reflected from the toner image 90 is condensed by the condensing unit 82 onto the incident slit 1 of the spectrometer 80. The light beam traveling through the incident slit 1 is reflected and diffracted by a concave diffraction element 2. The light beam is reflected and diffracted (in a spectral manner) on a one-dimensional array light detector 4 such as a CCD (line sensor) by different angles for respective wavelengths. Then, intensity values of light beams entering the light receiving elements of the light detector 4 are measured so as to perform the spectral measurement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-114058, filed on May 9, 2009, which is hereby incorporated by reference herein in its entirety.

What is claimed is:

1. A diffraction element comprising:
   a substrate with a curved surface having an anamorphic shape defined as a locus obtained by pivoting an arc (I) having a center (O) about a rotation axis that is a straight line (II); and
   a diffraction grating having gratings on the curved surface of the substrate,
   wherein the center (O), the arc (I), and the straight line (II) line exist in a same plane,
   wherein each of the gratings exists in a cross section orthogonal to the straight line (II),
   wherein both the center (0) and the straight line (II) are located on one side of the arc (I) in a direction perpendicular to the straight line (II) in the same plane, and
   wherein the curved surface has a curvature radius R in the same plane that is larger than a curvature radius r in the cross section orthogonal to the straight line (II).

2. A diffraction element according to claim 1, wherein the curved surface comprises a concave surface.

3. A diffraction element according to claim 1, wherein the diffraction grating comprises a reflective blazed grating.

4. A diffraction element according to claim 1, wherein the diffraction grating is manufactured by direct cutting work of the substrate using a working tool.

5. A diffraction element according to claim 1, which is manufactured by injection molding using a mold having a surface on which the diffraction grating is formed.

6. A diffraction element according to claim 1, which is manufactured by replica molding using a mold having a surface on which the diffraction grating is formed.

7. A diffraction element according to claim 1, wherein the curved surface is concave along both the same plane and the cross section orthogonal to the straight line (II).

8. A spectrometer comprising:
   a diffraction element including:
      a substrate with a curved surface having an anamorphic shape defined as a locus obtained by pivoting an arc (I) having a center (O) about a rotation axis that is a straight line (II); and
      a diffraction grating having gratings on the curved surface of the substrate,
      wherein the center (O), the arc (I), and the straight line (II) line exist in a same plane, and
      wherein each of the gratings exists in a cross section orthogonal to the straight line (II),
      wherein both the center (O) and the straight line (II) are located on one side of the arc (I) in a direction perpendicular to the straight line (II) in the same plane, and
      wherein the curved surface has a curvature radius R in the same plane that is larger than a curvature radius r in the cross section orthogonal to the straight line (II);
   an incident light introducing unit configured to guide light to enter the diffraction grating; and
   a light receiving unit configured to receive light spectrally divided by wavelengths by the diffraction element.

9. A spectrometer according to claim 8, wherein the incident light introducing unit and the light receiving unit of the diffraction element are disposed on a Rowland circle of the diffraction grating.

10. A method of manufacturing of a diffraction element comprising:
    a substrate with a curved surface having an anamorphic shape defined as a locus obtained by pivoting an arc (I) having a center (O) about a rotation axis that is a straight line (II); and
    a diffraction grating having gratings on the curved surface of the substrate,
    wherein the center (O), the arc (I), and the straight line (II) line exist in a same plane,
    wherein each of the gratings exists in a cross section orthogonal to the straight line (II),
    wherein both the center (0) and the straight line (II) are located on one side of the arc (I) in a direction perpendicular to the straight line (II) in the same plane,
    wherein the curved surface has a curvature radius R in the same plane that is larger than a curvature radius r in the cross section orthogonal to the straight line (II), and
    wherein the method comprises the steps of:
    performing cutting work by rotating a working tool about a rotation axis (III) within a finite rotation radius; and
    performing cutting work by rotating the rotation axis (III), to which the working tool is attached in a rotatable manner, about the straight line (II) serving as the rotation axis.

11. A method of manufacturing of a diffraction element comprising:
- a substrate with a curved surface having an anamorphic shape defined as a locus obtained by pivoting an arc (I) having a center (O) about a rotation axis that is a straight line (II); and
- a diffraction grating having gratings on the curved surface of the substrate,
- wherein the center (O), the arc (I), and the straight line (II) line exist in a same plane,
- wherein each of the gratings exists in a cross section orthogonal to the straight line (II),
- wherein both the center (0) and the straight line (II) are located on one side of the arc (I) in a direction perpendicular to the straight line (II) in the same plane,
- wherein the curved surface has a curvature radius R in the same plane that is larger than a curvature radius r in the cross section orthogonal to the straight line (II), and
- wherein the method comprises the steps of:
- performing a first cutting work for a surface of a mold by rotating a working tool about a rotation axis (III) existing in the same plane; and
- performing a second cutting work for the surface of the mold by rotating the rotation axis (III), about the straight line (II) serving as the rotation axis.

12. A color image forming apparatus comprising:
optical scanning apparatuses;
a developing device configured to develop an electrostatic latent image formed on each of multiple photosensitive members as a toner image;
a transferring device for transferring the developed toner image to a transfer material;
a fixing device configured to fix the transferred toner image on the transfer material; and
a spectrometer comprising:
- a diffraction element including:
  - a substrate with a curved surface having an anamorphic shape defined as a locus obtained by pivoting an arc (I) having a center (O) about a rotation axis that is a straight line (II); and
  - a diffraction grating having gratings on the curved surface of the substrate,
  - wherein the center (O), the arc (I), and the straight line (II) line exist in a same plane,
  - wherein each of the gratings exists in a cross section orthogonal to the straight line (II),
  - wherein both the center (0) and the straight line (II) are located on one side of the arc (I) in a direction perpendicular to the straight line (II) in the same plane, and
  - wherein the curved surface has a curvature radius R in the same plane that is larger than a curvature radius r in the cross section orthogonal to the straight line (II);
- an incident light introducing unit configured to guide light to enter the diffraction grating; and
- a light receiving unit configured to receive light spectrally divided by wavelengths by the diffraction element,
wherein the spectrometer performs spectral analysis for light reflected from the toner image fixed on the transfer material.

* * * * *